United States Patent [19]

Ricke

[11] Patent Number: 4,606,923
[45] Date of Patent: Aug. 19, 1986

[54] METHOD FOR EMBOSSING DOUGH RESULTING IN THE CONTROL OF BLISTERING, TASTE, AND TEXTURE OF FRIED PIZZA CRUSTS

[75] Inventor: Roy R. Ricke, Salina, Kans.

[73] Assignee: Schwan's Sales Enterprises, Inc., Marshall, Minn.

[21] Appl. No.: 776,568

[22] Filed: Sep. 16, 1985

Related U.S. Application Data

[63] Continuation of Ser. No. 522,316, Aug. 12, 1983, abandoned, which is a continuation-in-part of Ser. No. 413,878, Sep. 1, 1982, abandoned.

[51] Int. Cl.⁴ .............................................. A21D 6/00
[52] U.S. Cl. .................................. 426/496; 426/94; 426/439
[58] Field of Search ............... 426/496, 439, 502, 524, 426/94; 99/404; D1/1-2; 425/293, 294

[56] References Cited

U.S. PATENT DOCUMENTS

| | | | |
|---|---|---|---|
| 1,646,921 | 10/1927 | Loose . | |
| 1,737,363 | 11/1929 | Ehrhart . | |
| 1,926,313 | 9/1933 | Smith | 53/7 |
| 2,144,720 | 1/1939 | Gibson | 107/54 |
| 2,668,117 | 2/1954 | Bucci | 99/192 |
| 2,774,316 | 12/1956 | Daino | 107/54 |
| 2,905,559 | 9/1959 | Anderson et al. | 99/80 |
| 3,152,537 | 10/1964 | Dietz | 99/404 |
| 3,203,341 | 8/1965 | Hedgepeth | 99/230 |
| 3,379,141 | 4/1968 | Groth | 107/4 |
| 3,381,632 | 5/1968 | Pontecorvo | 107/8 |
| 3,384,495 | 5/1968 | Potter, Jr. et al. | 99/100 |
| 3,494,302 | 2/1970 | Wolf et al. | 107/1 |
| 3,615,678 | 10/1971 | Tangel | 99/86 |
| 3,615,679 | 10/1971 | Tangel | 99/85 |
| 3,635,149 | 1/1972 | Smith et al. | 99/404 |
| 3,641,924 | 2/1972 | Sijbring | 99/466 |
| 3,677,769 | 7/1972 | King | 99/86 |
| 3,757,672 | 9/1973 | Szabrak et al. | 99/404 |
| 3,765,909 | 10/1973 | Moline | 99/192 R |
| 3,770,358 | 11/1973 | Steels et al. | 425/291 |
| 3,845,219 | 10/1974 | Federico | 426/19 |
| 3,851,569 | 12/1974 | Madrid | 99/407 |
| 3,879,564 | 4/1975 | Cocozzella | 426/283 |
| 3,880,069 | 4/1975 | Moline | 99/483 |
| 3,966,983 | 6/1976 | Dexter et al. | 426/349 |
| 3,975,552 | 8/1976 | Stangroom | 426/243 |
| 4,046,920 | 9/1977 | Moline | 426/19 |
| 4,075,359 | 2/1978 | Thulin | 426/502 |
| 4,134,998 | 1/1979 | Liebermann | 426/438 |
| 4,170,659 | 10/1979 | Totino et al. | 426/95 |
| 4,187,771 | 2/1980 | Westover et al. | 99/404 |
| 4,208,441 | 6/1980 | Westover | 426/293 |
| 4,251,549 | 2/1981 | Fournet et al. | 426/19 |
| 4,271,200 | 6/1981 | Hempenius et al. | 426/27 |
| 4,275,082 | 6/1981 | Dougan | 426/92 |
| 4,308,286 | 12/1981 | Anstett et al. | 426/19 |

FOREIGN PATENT DOCUMENTS 851132 9/1970 Canada .

*Primary Examiner*—Raymond N. Jones
*Assistant Examiner*—Elizabeth A. King
*Attorney, Agent, or Firm*—Merchant, Gould, Smith, Edell, Welter & Schmidt

[57] ABSTRACT

An improved bakeable or fryable pizza dough is made by forming in a dough sheet a footprint of embossed or compressed zones along a grid-like set of lines wherein at the point where the grid lines would intersect the dough remains uncompressed.

20 Claims, 5 Drawing Figures

U.S. Patent Aug. 19, 1986 Sheet 2 of 2 4,606,923
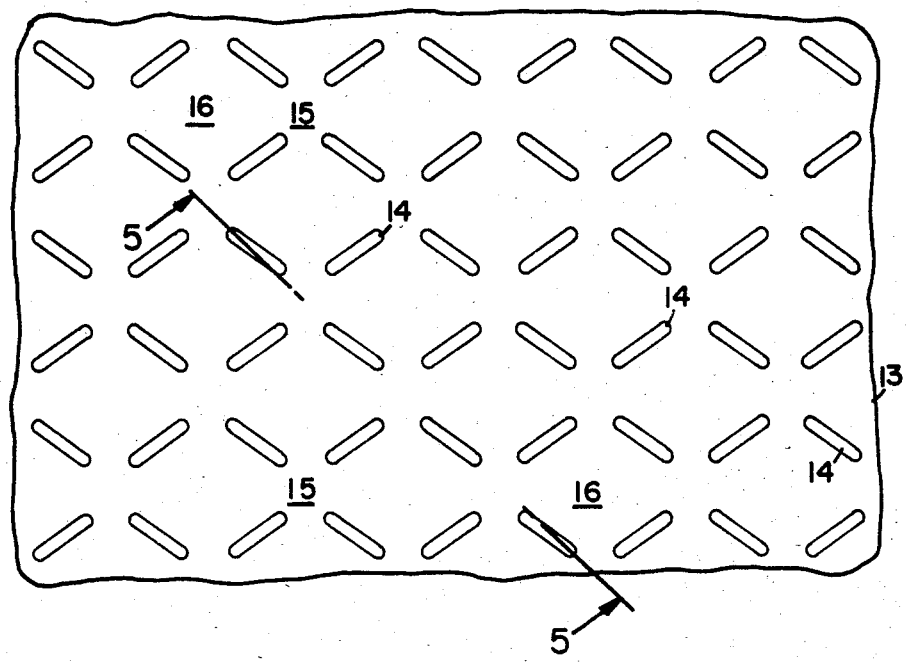
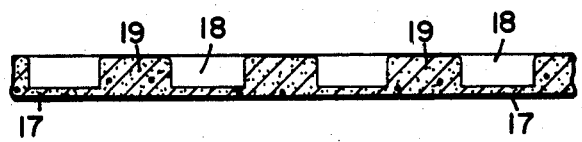
FIG.5

METHOD FOR EMBOSSING DOUGH RESULTING IN THE CONTROL OF BLISTERING, TASTE, AND TEXTURE OF FRIED PIZZA CRUSTS

This is a continuation of application Ser. No. 522,316, filed Aug. 12, 1983, which is a continuation-in-part of the application Ser. No. 413,878, filed Sept. 1, 1982, both abandoned.

FIELD OF THE INVENTION

The invention relates to embossed and fried pizza crust and methods of their manufacture.

BACKGROUND OF THE INVENTION

Pizza is an extremely popular food since it is tasty, convenient, and easy to prepare. Frozen pizzas can be purchased and can be conveniently reheated at home in a short period of time before consumption. While frozen pizzas continue to be an extremely popular food, they have encountered substantial consumer resistance since they do not compare favorably to pizzeria pizzas or those made at home from basic ingredients such as flour, water, tomato sauce, and meat. In other words frozen pizzas are often purchased for convenience rather than flavor.

Consumer resistance to prepared frozen pizzas is commonly directed to the quality of the shell or crust after baking. Initially, pizza shells or crusts comprised generally circular sections of dough that were prebaked at the factory, topped with pizza toppings, quick frozen and stored until sale. Upon reheating, consumers found that these prebaked shells would not become crisp during baking, or tended to be tough, hard, brittle and cracker-like after baking. In the face of such substantial consumer resistance, many pizza manufacturers developed pizza shells or crusts that were fried in oil prior to the application of pizza topping. Fried pizza crusts have solved many consumer and production related problems, but the fried crusts still possess drawbacks.

In our research, we have found that by frying pizza shaped dough sections, large delaminated areas can appear where the pizza crust separates into two layers separated by a large space. Further, we have found that large non-delaminated areas can also remain in the pizza crust in which no separation at all occurs. The large delaminated areas that form during frying can often be overcooked, can become extremely crispy and can have substantial size. The large non-delaminated areas can absorb substantial amounts of oil, can be undercooked, and can become soggy. We have identified the inability to control the distribution and size of the delaminated and non-delaminated areas as the reason the fried crusts can be disagreeable to certain consumers. Clearly a need exists to improve the taste and texture of pizza crusts by controlling the distribution and extent of delamination.

We have found that by forming dough with a certain embossed pattern or footprint compressed into the dough the size, shape and distribution of the delaminated and nondelaminated zones can be very closely controlled. The control of the delamination results in the associated control of cooking extent, fat content from the frying step, taste, and mouth feel.

DISCUSSION OF THE PRIOR ART

Novissimo, U.S. Pat No. 3,303,796 teaches forming three-dimensional shapes such as animal or human figures from confectionary materials such as chewing gum and candy by roll-pressing three dimensional shapes. Moline, U.S. Pat. No. 3,765,909 teaches a process for scoring a pizza shell into pie-shaped sections by stamping the frozen pizza in a die stamping unit. Wagner, U.S. Pat. No. 3,962,751 teaches a method for scoring food products such as meat patties in a scoring station using a scoring device comprising flexible plastic teeth used for penetrating the patty either completely or partially with plastic material being yieldable upon striking an obstruction. Totino, U.S. Pat. No. 4,170,659 teaches docking a dough sheet using punched holes which upon frying form fairly hard zones around the holes defining a rivet-like bond which connects the upper and lower surfaces of the pizza shell. Totino further teaches that by restraining the docked shell during cooking beneath a metal screen, the qualities of the shell can be improved. Westover, U.S. Pat. No. 4,208,441 teaches a method for cooking food products such as flat sheets of dough using an apparatus including a plurality of mating pocketed cooking irons mounted upon endless conveyors which completely enclose the dough sheet and control its delamination. Anstet, U.S. Pat. No. 4,308,286 teaches a method for producing a laminated imperforate nondocked product which comprises frying the dough while confining the dough between reticular forms, such as a metal mesh, spaced apart at a distance substantially equal to the thickness of the raw dough pieces, said forms being of a mesh size to control delamination of the dough during cooking in oil.

BRIEF DESCRIPTION OF THE INVENTION

I have found that pizza shells can be improved if the pizza dough is embossed, before cooking in oil, with an array or footprint of embossed or compressed zones arranged upon an imaginary grid-like pattern of lines, wherein the dough is not compressed at the points where the grid-like pattern of lines would intersect in the dough. The thus-formed compressed zones partly enclose or define a plurality of adjacent uncompressed or blister-forming zones which during frying delaminate and blister in a controlled fashion. For convenience I have described the array of zones compressed in the dough as being arranged along or upon a grid-like pattern. This terminology is used to illustrate the invention and should not be used to unduly limit the invention. The extent and distribution of delamination is controlled by the dimensions of the compressed zones and by the dimensions of the resulting partly enclosed uncompressed or blister-forming zones. The compressed zones cannot delaminate since delaminating bubbles have substantial difficulty forming in the dense compressed dough. In the blister-forming zones defined by the compressed zones, the extent of blistering or delamination can be controlled since the dough in the blister-forming zone cannot separate or blister past the compressed zone. Further, the amount of unblistered shell is controlled since essentially all the nondelaminated sections are present in the dense compressed zones which are resistant to oil absorption. In this way, the amount of oil absorption can be effectively controlled.

To the best of our knowledge the prior art does not teach or suggest controlling delamination, product quality, cooking extent, and oil absorption by embossing in uncooked dough upon a grid-like pattern of lines a plurality of compressed zones having the footprint described herein.

Delamination refers to separation during cooking of two layers of dough separated by a large void space or bubble. During cooking steam or other hot gas can be created at elevated temperatures forming a bubble between the layers. Blister-forming zones refer to the areas in dough where delamination can occur between the compressed zones during cooking. Two types of blister-forming zones can occur. Large blister-forming zones are defined by the sides of the compressed zones. Small intersection blister-forming zones are defined at the intersections of the imaginary grid lines at the ends of the compressed zones. Blister zones refer to the resulting delaminated volume that forms during frying from the blister-forming zones. Compressed or embossed zones refer to areas in the dough deliberately compressed to a thickness less than the original dough thickness.

BRIEF DESCRIPTION OF THE DRAWINGS

FIG. 4 is a view of the embossed dough.

FIG. 5 is a cross-section of the embossed dough through the compressed zone taken along line 5—5.

DETAILED DESCRIPTION OF THE INVENTION

Figure 1:
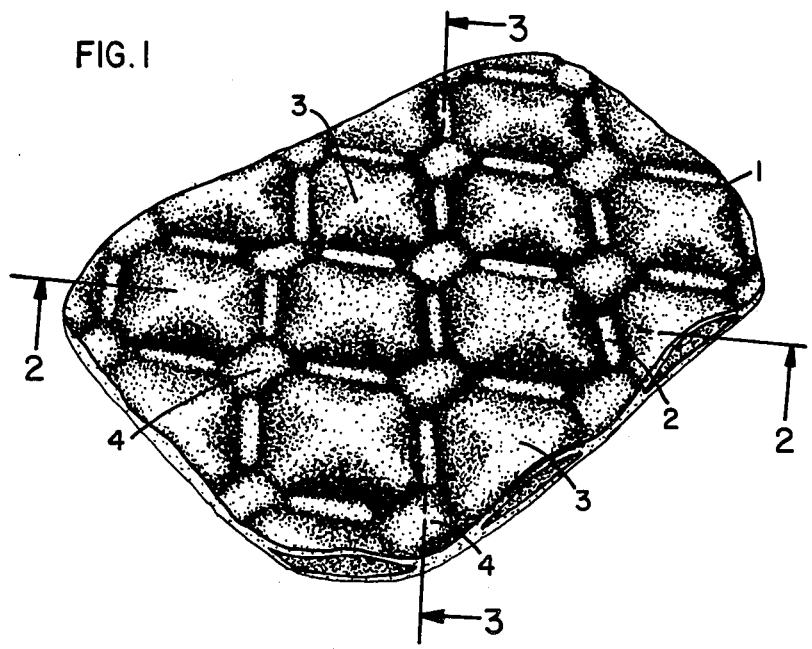
FIG. 1 is a perspective of the fried pizza crust.

Briefly, the improved pizza crusts or shells of this invention are made by a process comprising forming a dough mass, forming an embossable sheet or sections from the dough mass, embossing a pattern of compressed zones in the dough sheet upon or along an imaginary set of grid-like lines. The compressed zones are unconnected at the points in the dough where the grid lines would intersect leaving an area of uncompressed dough. After embossing, pizza shaped sections are fried and can be topped with tomato sauce, cheese, meat products, and pizza condiments.

Dough

The term "dough" generally designates a thick paste containing a leavening amount of yeast that is made from flour, sugar, water, oil, and other commonly used baking ingredients. The dough is commonly kneaded or mixed in pastry mixers until the desired rheological properties of the dough is obtained. The dough should be mixed enough to give the dough workability but not enough so that the shortening effect of the fat is reduced and the dough becomes too tough. After a dough mass is formed, it is formed into a sheet having dimensions of about 0.1–1.0 inches (about 0.25–2.5 cm) in thickness and about 25–40 inches (about 60 to 110 cm) in width. Preferably, the dough is extruded under pressure through a die which roughly controls the width and thickness of the sheet. After extrusion the sheet is passed through one or more rollers or other sheeting apparatus which very closely controls the thickness and width of the dough sheet. The embossed pattern can either be formed in the dough sheet or the unembossed dough sheet can be cut into pizza shaped sections and the embossed pattern can then be formed. The pizza sections can then be fried, pizza condiments can be added and the assembly can be frozen until sale.

Grid Lines

The embossed or compressed zones are arranged upon or along an imaginary grid-like pattern in such a way that control of the delamination results. A grid is defined as a network of uniformly spaced substantially horizontal and perpendicular lines. The grid lines can be perpendicular (an angle of 90°) at intersection points or can be grid-like array at an angle that departs substantially from the perpendicular (20°-60°, preferably 30°-40°, most preferably about 35°) resulting in the formation of a grid-like arrangement of square, rectangular or parallelogram-like areas.

Blister Zones

Pizza dough, having the compressed zones embossed into the dough, upon frying displays a controlled blistering effect which results from embossing in the dough two types of blister-forming zones. Large blister-forming zones which occur within the space defined by the sides of the embossed or compressed zones. Intersection blister-forming zones occur at the unembossed areas where the grid-like pattern would intersect if connected by compressed areas and are defined by the ends of the embossed or compressed zones.

The large blister-forming zones can have a quadrilateral shape which ranges from rectangular or square to a parallelogram shape, depending on the angle of intersection of the grid-like lines upon which they are arranged. The dimensions of the blister-forming zones can vary from about 2 to 8 cm, preferably 2.5 to 4 cm, most preferably about 3 to 4 cm. The area of the blister-forming zones can vary from about 10 to 18 square centimeters, preferably about 12 to 16.5 square centimeters and most preferably, for reasons of close control over cooking extent and blister size, about 14 square centimeters. The height of the blister, measured from the bottom of the crust to the top of the blistered crust, can vary depending on dough density, cooking temperature, and moisture content, however the height generaly falls within the range of about 0.5 to about 4 centimeters.

The smaller intersection blister-forming zones form in the space defined by the ends of the elongated zones at the uncompressed intersection point of the grid lines. The ends of the compressed zones are about 1 to 4, preferably about 1.5 to 3.5 centimeters apart at the intersection, measured along the grid line. The closest ends of hte compressed zones are about 0.1 to 3 cm apart measured not along a grid line. We have found that it is not beneficial to extend the compressed zones through the intersections since this results in a substantially weakened crust that tends to break along the grid lines. Leaving the intersection zones unembossed provides a substantial amount of strength to the crust. The smaller intersection blister-forming zones also commonly define a square, rectangular to parallelogram-like shapes. The unembossed, uncompressed area of the intersection blister-forming zone defined by the ends of the compressed zones, commonly varies from about 0.5 to 3 square centimeters, preferably from about 1 to about 2.75 square centimeters. Most preferably, for reasons of strength, cooking extent, and pizza shell regularity, the small intersection blister-forming zones have an area of about 2.1 square centimeters. The height of the blister zone after frying varies depending on the nature of the dough, water content, cooking temperature, and other effects, however the height of the fried blister zone commonly ranges from about 0.5 to about 2 centimeters.

Compressed or Embossed Zones

The regularity of the large blister zones and the intersection blister zones after frying are derived from the pattern of compressed zones formed in the dough by an embossing means. We have found a unique, novel shape and arrangement of the compressed zones along the grid-like lines that results in a fried crust with substantial mechanical strength, yet having substantial control over the extent and distribution of the blister zones during frying. The compressed zones are formed along the grid-like lines but do not connect at the grid intersections. Maintaining a separation between the ends of blister-forming zones prevents the formation of a compressed line across the dough which would result in substantial weakness. Accordingly, the elongated compressed zones will occupy a fraction of the grid lines which comprises about 40 to 80% of the grid line. The uncompressed areas preferably being at the intersections. The dimensions of the compressed zones vary depending on the area of blister zones which are desired. We have found, however, that useful compressed zones can be formed having a length of from about 1 to 5, preferably about 1.6 to 3.5 centimeters and a width of from about 0.1 to 1.0, preferably 0.2 to 0.6 centimeters. The compressed zone can take the form of an oval, an elongated rectangle or a rectangle with rounded ends.

We have also found that there is a certain percentage of the area of the dough which must be compressed in order to effectively control delamination. The mechanical integrity, texture and flavor of the crust is maintained if from about 6 to 12%, preferably about 8 to 12% and most preferably about 8% of the dough is compressed based on the uncompressed area.

Further, we have found that in order to substantially control delamination, the thickness of the dough in the compressed or embossed zones must be compressed to a certain degree. We have found that compressing the dough past a certain degree of compression, the crust becomes weakened, and can become perforated by the compression means. Using a lesser amount of compression results in a lesser amount of control of delamination and blistering. Accordingly, the depth of compression of the dough in the embossed zone ranges from about 6 to about 12% of the original depth, preferably, 6 to 10% of the original depth. We have also found that for optimum results the area of the compressed zone should be from about 0.1 to about 3.0 square centimeters, preferably about 0.8 to 1.2 square centimeters.

The angle between the imaginary grid lines on which the elongated compressed zones are formed can be about 90°, forming a square or rectangular blister-forming zone. Alternatively, the angle between the imaginary grid lines can range from 20° to 60°, forming a parallelogram shaped blister zone. We have found that the blister zones and the control of delamination is optimized if the acute angle between grid lines ranges from about 30° to 40° and the complimentary obtuse angle ranges from about 150° to 140°. The most preferred acute angle is about 35° (the complimentary obtuse angle is 145°).

A further preferred arrangement of the embossed zones along the grid lines can be made for optimum results in the crust. As discussed above, the compressed zones are not formed at the grid intersection lines in order to strengthen the crust. However, there is still some weakness caused by the compressed zones lying in direct alignment along the grid line. We have found that altering the alignment of the compressed zones along the grid line in certain ways improves the strength the crust. One way to visualize the altered alignment of the compredssed zone is to visualize that the imaginary grid line runs through the center of each elongated compressed zone and that the elongated compressed zones are rotated around the center of the zone through an angle of up to about 30°. The centers of each zone remain along the imaginary grid line but the ends are displaced on either side of the grid line. We have found that this rotation prevents the elongated zones from creating a score line across the crust resulting in a weakness. Another way to visualize the altered arrangement of the compressed zones is that the compressed zones are displaced laterally from a neighboring compressed zones by about 0.3 to 0.8 cm, preferably about 0.5 cm. In this way, the lateral displacement of the compressed zones results in the formation of the compressed zones which then do not lie along the same line.

An embossing means and a related process for embossing is disclosed in U.S. Ser. No. 413,886, filed Sept. 1, 1982.

DETAILED DESCRIPTION OF THE DRAWINGS

FIG. 1 shows a perspective of the embossed surface of the crust 1 after frying. The benefits of the embossed or compressed zones are apparent in the Drawing. The fried crust shows the regularity of the compressed zones 2 which define the large blister zones 3 for and the smaller intersection blister zones 4. It is readily apparent that the large blister zones 3 are virtually identical in shape, size, delamination extent, and extent of cooking. Further, the smaller intersection blister zones 4 are also regular in size and possess the same cooking extent. As a whole, the fried crust 1 presents an evenly cooked, non-soggy, easily handled regular piece that can easily be topped with tomato sauce, meat, cheese and pizza condiments, wrapped and frozen. The altered alignment of the compressed zones can be seen along line 3—3.

Figure 2:
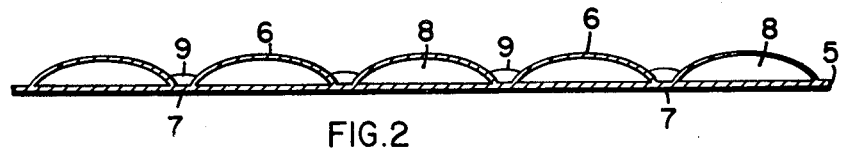
FIG. 2 is a cross-section of the fried pizza crust through the large blister zones taken along line 2—2.

FIG. 2 shows a cross-section of the fried crust 5 showing the large blister zones 6, the compressed zones 7, the internal bubbles created by steam formed during the cooking of the crust 8, and the smaller intersection blister zones 9 behind the larger blister zones. Clearly the unformity of the crust is shown. The interior bubbles inside the blister zones are regular, the crust thickness around the bubbles and at the compression zone are regular.

Figure 3:
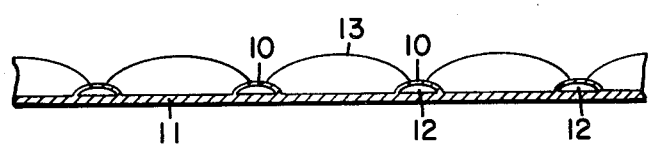
FIG. 3 is a cross-section of the fried pizza crust through the intersection blister zones taken along line 3—3.

FIG. 3 shows a cross-section of the fried crust through the smaller intersection blister zones 10 showing the length of a compressed zone 11, the interior of the intersection blister zones 12 and the larger blister zone 13 behind the intersection blister zones. Again, the uniformity of the crust, thickness, the regularity in size, shape and distribution of the blister zones, the uniformity in thickness at the compressed zone are all shown, which result in a crust that is not over or under-cooked and has a regularity in shape size and function.

FIG. 4 shows a portion of an uncooked dough sheet 13 having an embossed pattern comprising a number of compressed zones 14. The lack of compression of the smaller intersection blister-forming zones 15 is apparent and the extent of the large blister-forming zones 16 is shown. The altered alignment of the compressed zones is shown along line 5—5.

FIG. 5 shows a cross-section of the crust 17 before frying. The compressed zones 18 are apparent and the intersection blister-forming zones 19 are shown before delamination.

DESCRIPTION OF THE PREFERRED EMBODIMENT

A workable dough is blended from a variety of ingredients in appropriate mixers. The dough mixer may be a batch mixer as known in commercial baking fields for producing batches ranging in size from about 100 lbs. up to as much as 2,000 lbs. Alternatively, the dough mixer may comprise other known mixers such as continuous mixers in which the ingredients are supplied as continuous streams in the proper ratios and the workable dough is produced as a continuous output stream. Commercial rates of production could be in the range of about 100 to 3,000 lbs. per hour.

The usable doughs in this invention can be compounded in two different methods. The first method comprises mixing a beer comprising yeast, sugar and 90° to 100° (about 32° to 38° C.) water which is maintained in a dispersed form until the yeast enters its growth phase. The beer should be maintained at an acidic pH less than 6, preferably about 4.5. The beer is then mixed with flour, salt, dough conditioner, extra water, and vegetable oil until the dough forms a substantially blended, shortened, resilient mass that can be handled in common dough handling machines. Alternatively, the dough can be compounded by directly mixing sugar, water, yeast, flour, salt, dough conditioner, and vegetable oil blending and then holding the dough until the yeast enters its growth phase for active leavening. One example of a useful recipe for dough which can be used in either of the above alternative compounding methods is as follows:

| Ingredient | Amount |
| --- | --- |
| Yeast | 40 parts |
| Sugar | 15 parts |
| Water | 624 parts |
| Flour | 1200 parts |
| Salt | 18 parts |
| Dough conditioner | 2.5 parts |
| Corn oil | 24 parts |

The raw mixed shortened dough is then sheeted, commonly using commercially available sheeting equipment which handles the dough gently and produces a smooth, workable sheet. Commonly the sheet is formed with dimensions of about 25 to 40 inches, preferably about 30 to 36 inches in width and about 0.1 to 1 inch, preferably about ⅜ to 1 inch in depth. The embossed pattern can be impressed in the dough at this point, or the sheeted dough can be cut into sections and the embossed pattern can be formed after cutting. However, preferably the sheet is embossed before cutting. After the embossed pattern is formed in the dough, the dough is proofed at about 80°–100° F. (27°–38° C.), in order to permit the activated yeast to leaven the dough for 8 to 10 minutes. The proofed dough section is then transported to a fat fryer where it is cooked in oil at an elevated temperature. The cooking time and temperature can vary greatly depending on the extent of cooking. However, we have found that the pizza section is preferably cooked for 30 to 40 seconds in oil at a temperature of about 275° to 500° F. (about 135° to 260° C.), preferably 350° to 450° F. (about 175° to 235° C.). Alternatively the proofed dough section can be partially fried at the same temperatures and its cooking can be completed by baking the dough free of oil at an elevated temperature of about 250° F. to 400° F. in common baking equipment. After cooking is complete, the dough sections are cooled, pizza condiments are added, the pizzas are wrapped and quick frozen for sale.

EXAMPLE I

Into a suitable container was placed 2.08 parts bakers yeast (compressed), 0.78 parts sugar, and 5.20 parts water at about 80°–90° F. (27°–32° C.) The ingredients in the container were mixed until uniform and held at 80° F. (27° C.) for 30 minutes until the yeast entered its growth phase. The pH of the yeast mixture was adjusted to about 4.5. Into a horizontal Peerless mixer was placed the activated yeast blend with 62.39 parts flour, 0.94 parts salt, 0.13 parts DO-FLO dough conditioner, 1.25 parts corn oil and 27.24 parts of water. The mixer was operated at its slow speed for 2 minutes and at its fast speed for 3 minutes providing a workable shortened dough that was not tough. The dough was transferred to an extruder having a die with an opening having dimensions of ¾ inches by 30 inches (19 mm×76.2 cm). The dough was extruded and was sheeted into a dough web having dimensions of about ⅛ inch (4 mm) in depth by 30 inches (76.2 cm) in width. The sheeted dough was embossed with a solid aluminum roller-embosser having raised areas or elements that create the embossed or compressed zone footprint in the dough. The raised embossing elements were 0.3 cm in width and 1.9 cm long. The sides of the embossing elements were 3.8 cm apart creating a blister-forming zone of about 14.4 square centimeters. The ends of the embossing elements were spaced about 1.25 centimeters apart. The area of the embossed zones comprised 8.1% of the uncompressed dough surface. The compression of the compressed or embossed zones comprised about 8% of the original dough thickness. The angle between the grid-like arrangement of compressed zones was 35°. The embossed dough sections were cut into 10¾ inch sections.

The cut embossed dough sections were proofed for 10 minutes at 85° F. in a chamber having 75% relative humidity. The proofed embossed dough sections were fried in soybean oil at 400° for 30 seconds, were cooled, tomato sauce, meats and pizza condiments were added, and the pizza was frozen.

The frozen pizza was reheated and the flavor, texture, and appearance of the crust compared favorably to pizzeria or homemade pizzas.

The Example and description above is illustrative of the invention, however since many variations and embodiments of the invention can be made the invention resides wholly in the claims hereinafter appended.

We claim:

1. A method of embossing dough, to control delamination during frying to improve taste and blister regularity, which comprises forming in a dough sheet, a plurality of elongated compressed zones in a grid-like pattern, wherein about 6 to 12% of the surface area of the dough is formed into the elongated compressed zones and the depth of the elongated compressed zone comprises about 6 to 12% of the original depth, wherein at the point where the grid lines would intersect the dough remains uncompressed, and wherein the elongated compressed zones substantially define a plurality of adjacent, compressed zone-sharing, uncompressed blister-forming zones.

2. The method of claim 1 wherein the dough sheet has dimensions of about 0.1 to 1 inch in depth and about 25 to 40 inches in width.

3. The method of claim 1 wherein the grid-like pattern comprises uniformly spaced lines, wherein at the intersection of the lines an angle of about 20° to 60° is defined.

4. The method of claim 3 wherein the angle is about 30° to 40°.

5. The method of claim 1 wherein the uncompressed blister-forming zones are about 2 to 8 centimeters independently in length and width and have an area of about 10 to 18 square centimeters.

6. The method of claim 5 wherein the blister-forming zones have dimensions of about 3.4–3.9 centimeters and an area of about 12 to 16.5 square centimeters.

7. The method of claim 6 wherein after cooking, the blister-forming zones form blisters having a height measured from the bottom of the shell to the top of the blister of about 0.5 to 4 centimeters.

8. The method of claim 1 wherein a plurality of intersection blister zones are defined by the ends of the elongated compressed zones wherein the ends of the compressed zones measured along the grid lines are from about 1 to 4 centimeters apart.

9. The method of claim 8 wherein the ends of the compressed zones are about 0.1 to 3 centimeters apart from the nearest compressed zone not along a grid line.

10. The method of claim 9 wherein the ends of the compressed zones are from about 0.1 to 3 centimeters apart from the nearest compressed zone not along a grid line.

11. The method of claim 8 wherein the area of the intersection blister-forming zones comprises about 0.5 to 3 square centimeters.

12. The method of claim 1 wherein the elongated compressed zones along a grid line occupy about 40 to 80% of a grid line.

13. The method of claim 1 wherein the length of the elongated cmpressed zone comprises about 1 to 5 centimeters.

14. The method of claim 13 wherein the length of the elongated cmpressed zone comprises about 1.6 to 3.5 centimeters.

15. The method of claim 1 wherein the width of the elongated compressed zone comprises about 0.1 to 1 centimeter and the area comprises about 0.1 to 3 square centimeters.

16. The method of claim 1 wherein the width of the elongated compressed zone comprises about 0.2 to 0.4 centimeters and the area comprises about 0.8 to 1.2 square centimeters.

17. The method of claim 1 wherein the shape of the elongated compressed zone comprises an oval, a rectangle, or a rectangle with rounded ends.

18. The method of claim 1 wherein the alignment of the elongated compressed zones along the grid lines is altered by rotating the elongated compressed zones less than about 30° around a point in the elongated compressed zone where the grid line passes through the center of the zone.

19. The method of claim 1 wherein the alignment of the elongated compressed zones is altered by laterally displacing the elongated compressed zones from adjacent elongated cmpressed zones along a grid line by about 0.3 to about 0.8 centimeters.

20. The method of claim 19 wherein the elongated compressed zones are laterally displaced about 0.5 centimeters.

* * * * *